Oct. 18, 1938.  W. E. GUNDELFINGER  2,133,508
ELECTRIC STOVE CONSTRUCTION
Filed May 13, 1935
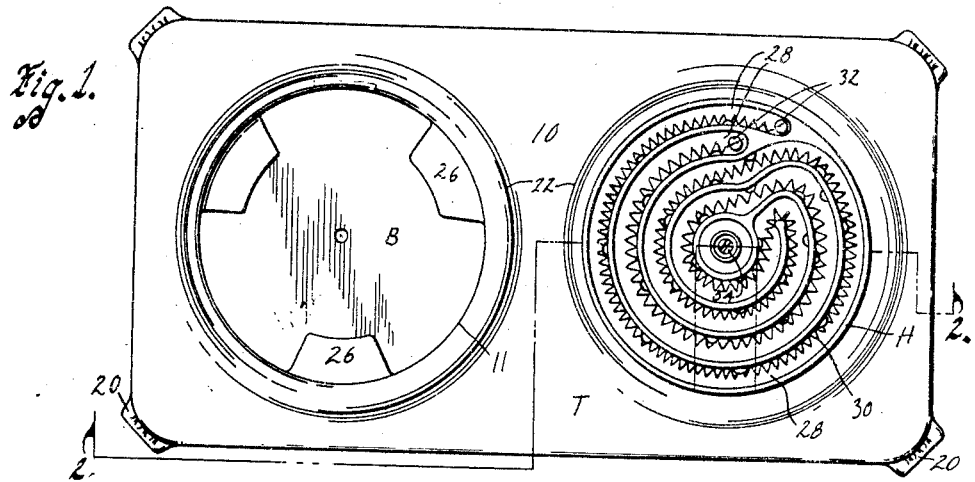
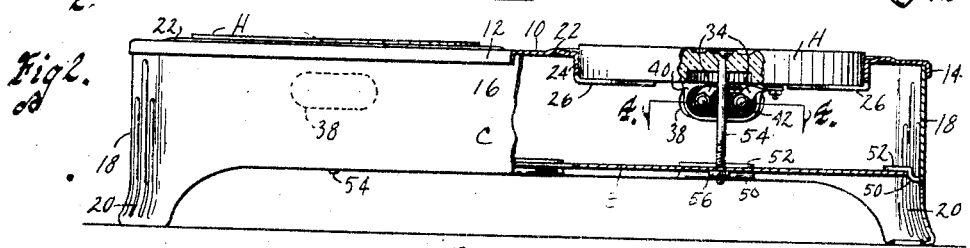
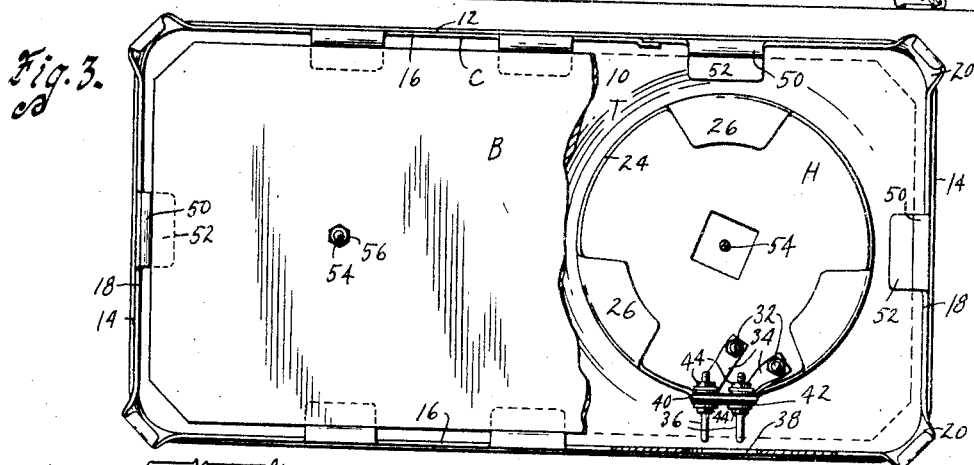
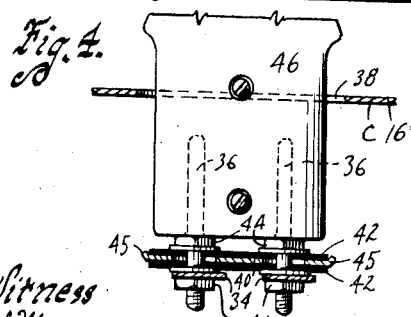
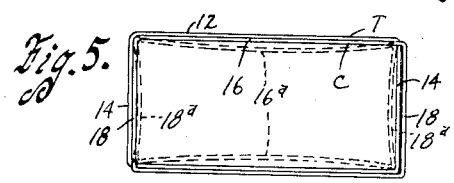
Inventor
William E. Gundelfinger
By Bair, Freeman & Sinclair
Attorneys
Witness
S. Munzenmaier Patented Oct. 18, 1938

2,133,508

UNITED STATES PATENT OFFICE 2,133,508

ELECTRIC STOVE CONSTRUCTION

William E. Gundelfinger, St. Louis, Mo., assignor to Knapp-Monarch Company, St. Louis, Mo., a corporation of Missouri Application May 13, 1935, Serial No. 21,175

12 Claims. (Cl. 219—37)

An object of my invention is to provide an electric stove construction, made inexpensively of few parts, yet one which is durable.

A further object is to provide a stove construction made for the most part of sheet metal, the parts being so formed and associated that they facilitate assembly, yet provide a substantial and solid casing for supporting the heating elements of the stove.

More particularly, it is my object to provide a sheet metal casing for supporting electric heating elements, the casing being formed of a wall element and top and bottom plates, and a simple securing means being provided for the heating element, which when in assembled position secures all parts of the casing in assembled relation to each other, as well as securing the heating element in its position.

Still a further object is to so construct the bottom plate, wall element and top plate and associate them with each other, that they are rigidly held in assembled position and all parts are held against undesired bending by such association, even though the parts are made of comparatively thin sheet metal.

Still a further object is to provide a novel support for connecter prongs of the heating element, which when electrically connected with the heating element, retain it assembled relative to the top plate, until the top plate can be assembled relative to the remaining parts of the construction.

With these and other objects in view, my invention consists in the construction, arrangement and combination of the various parts of my electric stove construction, whereby the objects contemplated are attained, as hereinafter more fully set forth, pointed out in my claims, and illustrated in the accompanying drawing, in which:

Figure 1 is a plan view of a stove construction embodying my invention, one of the heating elements being removed for showing details of the construction of the top plate.

Figure 2 is a vertical, sectional view on the line 2—2 of Figure 1.

Figure 3 is a bottom, plan view, part of the bottom plate being broken away to show the association of the heating element with the top plate.

Figure 4 is an enlarged, sectional view on the line 4—4 of Figure 2, showing a means for electrically connecting the heating element in a circuit; and Figure 5 is a bottom, plan, diagrammatic view, showing how parts of the invention are assembled.

On the accompanying drawing, I have used the reference character T to indicate generally a top plate. The top plate T consists of a flat sheet of metal, the flat part of which is indicated at 10. Openings 11 are cut in the part 10.

At the periphery of the part 10, side and end flanges 12 and 14 depend from the edge of the plate.

For supporting the top plate T, I provide a wall element C, which comprises side walls 16 and end walls 18. These are formed so that leg elements 20 depend from each corner thereof.

The casing for the stove consists of the elements T and C and a bottom plate B. The top plate T has around each opening 11 therein a raised rib 22 for reinforcing purposes.

Within each opening 11, the plate 10 is formed with a down-turned reinforcing and positioning flange 24. Parts of this flange terminate in supporting legs 26, which project toward each other and which are provided for supporting a heating element H.

The heating element H is formed of insulating material in the usual manner, grooves 28 being provided for an electric resistance wire 30 and terminal screws 32 being provided for the ends of the resistance wire. The screws 32 are connected by connectors 34 consisting of straps or the like with terminal prongs 36.

Access is had to the terminal prongs 36 through an opening 38 in the wall element C.

For supporting the terminal prongs 36, an ear 40 depends from a portion of the flange 24. It is provided with a pair of enlarged openings (see Figure 4) for the terminal prongs 36 to extend through, suitable insulating washers 42 being interposed between lock nuts 44 of the prongs 36 and the ear 40 to prevent short-circuiting of the current.

The edges of the ear 40 are turned slightly as at 45 to prevent undesired displacement of the upper washer 42, in Figure 4, so that the prongs will not contact with the edges of the openings in the ear 40.

In Figure 4 also, I show a connecter plug 46 of the usual cord set type inserted through the opening 38 of the wall element C for coaction with the prongs 36 for thereby supplying electric current to the resistance wire 30.

The bottom plate B engages projections 52 extending inwardly from the wall element C. At 50, the projections 52 are so bent that they engage the peripheral edge of the plate B.

For holding the plate B in position and for also holding the heating element H in its proper position, I provide bolts 54, which extend through the heating element and the bottom plate and are provided with nuts 56 to retain them in position.

Thus the bolt 54 serves as a common means for holding the heating element in position on the top plate, holding the top plate in position on the wall element, and holding the bottom plate in position relative to the wall element, whereby all parts of the stove casing and heating element are finally retained in their assembled position.

During assembly, the straps 34 serve to connect the heating element H with the top plate T, so that these parts remain in their proper relative positions, this being the initial assembly step.

The element C is formed slightly larger than the outline of the top plate T at the interior surface of the flanges 12 and 14 as shown in Figure 5. This difference is very slight, although, of course, it had to be exaggerated in order to show it in Figure 5. By such an arrangement, the flanges 16 and 18 must be sprung or bowed inwardly to the positions indicated at 16a and 18a in order for the wall element C to be inserted inside the flanges 12 and 14. Thereafter the wall elements 16 and 18 must be swung outwardly to the position of Figure 3 before the plate B can be positioned. The plate B then (by engaging the parts 50 of the wall element C) retains the wall element against the flanges 12 and 14, so that the walls, can not bend either inwardly or outwardly, and are retained in position, so that all parts reinforce each other and make a substantial casing construction for supporting the heating elements, and the weight of anything that might be placed on them.

Some changes may be made in the arrangement and construction of the various parts of my electric stove construction, without departing from the real spirit and purpose of my invention, and it is my intention to cover by my claims, any modified forms of structure, or use of mechanical equivalents, which may be reasonably included within their scope.

I claim as my invention:

1. In a stove construction, a vertical wall element, a horizontal top plate supported by the upper edge thereof, a bottom plate spaced below said top plate, said wall element having inward extensions provided with shoulders adjacent said wall element, said bottom plate being positioned beneath and against said extensions and positioned laterally by said shoulders, a heating element supported on said top plate and means extending from said heating element to said bottom plate to retain them against said top plate and said extensions respectively.

2. In a stove construction, a plurality of vertical wall elements of relatively thin sheet metal, a horizontal top plate element supported on the upper edge thereof, flanges depending from the outer edges of said top plate element and positioned outside of said wall elements for retaining said top plate in position on said wall elements against horizontal movement relative thereto and for retaining said wall elements against outward bending, said wall elements having, near their bottom edges, inward projections, a bottom plate having its edge engaging the bottom surfaces of said projections, said bottom plate being within said wall elements for retaining them against inward bending, a heating element supported by said top plate element and means in contact with only two of said elements adapted to retain said heating element and said bottom plate element in position against said wall elements, said projections and said top plate element and thereby retain all four of said elements in assembled relation with each other.

3. In a stove construction, a vertical wall element, a horizontal top plate supported by the upper edge thereof, a bottom plate spaced from said top plate, said wall element having inwardly projecting means, said bottom plate engaging the bottom thereof, said bottom plate being retained by said means against horizontal movement relative to said wall element, a heating element supported on said top plate, and rod-like means extending through said heating element and bottom plate to draw them toward each other and thereby retain said wall element and said top plate in assembled relation.

4. In a stove construction, a vertical wall element, a horizontal top plate supported by the upper edge thereof, a bottom plate spaced from said top plate, said wall element having inwardly directed projections, said bottom plate engaging the bottom surfaces thereof, means on said projections to prevent horizontal movement of said bottom plate relative to said projections, a heating element supported on said top plate, and common securing means to draw said heating element and bottom plate toward each other and thereby retain said wall element and said top plate in assembled relation.

5. In a stove construction, a vertical wall element, a horizontal top plate supported on the upper edge thereof, means for retaining said top plate in position on said wall element against horizontal movement relative thereto, a bottom plate spaced from said top plate, said wall element having inwardly projecting means, said bottom plate engaging the bottom thereof and being positioned thereby against horizontal movement relative to said wall element, a heating element supported on said top plate, and tie means extending from said heating element to said bottom plate to tie them together and retain said wall element and said top plate in assembled relation to each other.

6. In a stove construction, a vertical wall element, a horizontal top plate supported by the upper edge thereof, a bottom plate having its edge engaging under said wall element at a point spaced from said top plate, a heating element supported on said top plate, a depending flange on said top plate and spaced inwardly from said wall element, connecter prongs for said heating element supported by said flange and terminating inside of said wall element, said wall element having an opening for insertion of a connecter plug to a position for coaction with said connecter prongs, and tension securing means extending from said heating element to said bottom plate to retain them, said wall element and said top plate in assembled relation to each other.

7. In a stove construction, a vertical wall element, a horizontal top plate supported by the upper edge thereof, a bottom plate having its edge engaging under said wall element at a point spaced from said top plate, a heating element supported on said top plate, a depending prong supported on said top plate and spaced inwardly from said wall element, connecter prongs supported thereby and terminating inside of said wall element, connecting means between said prong and said heating element to afford electric connection between the heating element and the prongs and to secure said heating element to said top plate, and tension means extending from said heating element to said bottom plate to retain them, said wall element and said top plate in assembled relation to each other.

8. In a stove construction, a vertical wall element, a horizontal top plate supported by the upper edge thereof, a bottom plate having its edge engaging beneath said wall element at a point spaced from said top plate, a heating element supported by said top plate, a depending prong support on said top plate and spaced inwardly from said wall element, connecter prongs supported thereby, means for electrically connecting said heating element with said prongs, and rod-like securing means extending through said heating element and bottom plate to tie them to each other, said wall element and said top plate being thereby retained in assembled relation to each other.

9. A stove construction comprising a wall element, top and bottom plates for coaction with the upper and lower edges thereof, a heating element supported by said top plate, and tie means extending through said heating element and bottom plate for retaining said top plate, heating element, wall element and bottom plate all assembled relative to each other, said top plate having a depending prong support spaced inwardly from said side wall element, and prongs supported thereon and electrically connected with said heating element.

10. A stove construction comprising a wall element, top and bottom plates for coaction therewith, a heating element supported by said top plate, and means extending from said heating element to said bottom plate for tying them to each other and thereby retaining said top plate, heating element, wall element and bottom plate all assembled relative to each other, said top plate having a depending prong support, and prongs supported thereon and electrically connected with said heating element, said wall element having an opening therein for affording access of a connecter plug to said prongs.

11. In a stove construction, a vertical wall element having inward projections, a horizontal top plate supported adjacent the top thereof, means for retaining said top plate in position relative to said wall element against horizontal movement, a bottom plate spaced from said top plate and engaging said projections and being positioned thereby against horizontal movement relative thereto, retaining means on said top plate and a heating element supported on top of said top plate, a position retained by said last means against lateral displacement, and means extending from said heating element to said bottom plate to retain them together and retain said wall element, to said top plate in assembled relation to each other and to retain a portion of said wall element and its projections interposed between said top and bottom plates.

12. In a stove construction, a vertical wall element, a horizontal top plate supported by the upper edge thereof, a bottom plate spaced below said top plate, said wall element having inward extensions, said bottom plate being positioned beneath and against said extensions, a heating element supported on said top plate, and means extending from said heating element to said bottom plate to retain said heating element against said top plate and said bottom plate against said extensions.

WILLIAM E. GUNDELFINGER.